United States Patent Office 3,277,054
Patented Oct. 4, 1966

3,277,054
HIGH MOLECULAR WEIGHT RESINS
Israel J. Dissen, Chicago, Ill., assignor to Velsicol Chemical Corporation, Chicago, Ill., a corporation of Illinois
No Drawing. Filed Dec. 6, 1965, Ser. No. 512,032
10 Claims. (Cl. 260—47)

This application is a continuation-in-part of my copending application Serial No. 176,862, filed February 26, 1962, now abandoned.

This invention relates to new polymeric compositions. In particular this invention relates to new polymeric compositions of the following structural formula:

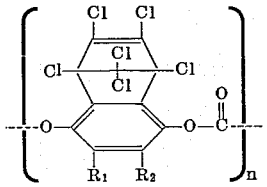

Structure I wherein $R_1$ and $R_2$ are independently selected from the group consisting of hydrogen, halogen, phenyl and lower aliphatic radicals and $n$ is an integer from 15 to 1000.

It is preferred for maximizing certain properties of the present compositions that $n$ in the above formula be an integer from 50 to 150.

It can be seen from the foregoing formula that due to its symmetry, the $R_1$ and $R_2$ substituents are equivalent. Compositions wherein $R_1$ and $R_2$ are as follows are of particular interest.

| $R_1$ | $R_2$ |
|---|---|
| hydrogen | hydrogen |
| halogen | hydrogen |
| phenyl | lower aliphatic |
| lower aliphatic | lower aliphatic |
| halogen | halogen |
| methyl | hydrogen |
| phenyl | hydrogen |
| chlorine | hydrogen |

These new resinous compositions can be prepared by contacting phosgene and a compound of the general formula

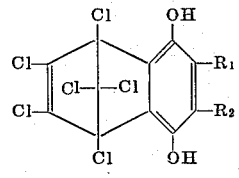

Structure II wherein $R_1$ and $R_2$ are independently selected from the group consisting of hydrogen, halogen, phenyl, and lower aliphatic radicals, in the presence of an acid acceptor.

The new polymeric compositions obtained by the method of this invention have a variety of advantages. These thermoplastic resins have high softening points which make them particularly useful in the fabrication of electrical and electronics equipment and other applications where heat can be generated. As a further advantage in such applications, the new polymeric compositions of this invention are non-burning and therefore offer a great safety advantage.

In addition, these new polymeric compositions have unusually advantageous solubility and fusibility not expected on the basis of the literature. Einhorn (Leibig's Ann. Chem. 300, p. 135 (1898)), and subsequent workers report that the interaction of hydroquinone and phosgene lead to an infusible and insoluble crystalline powder. These compositions are described in the literature as being intractable.

On the contrary, the present polymeric compositions are soluble and fusible. This enables their ready use in the manufacture of molded articles.

Also, the present polymeric compositions exhibit exceptional hydrolytic stability in caustic solutions. This property is evident at room temperature and at elevated temperatures. As to thermal properties, such as heat distortion temperature and thermal conductivity, the present compositions show marked superiority. The electrical resistance of these compositions is high and of particular value when used in the preparation of articles used in the presence of electrical currents.

These properties make the new polymers particularly useful in the manufacture of printed circuit card guides, relay bases, connectors, cover plates, light cell reflector bases, signal light lenses, dials, tuner spacers, telephone line connectors, and other electrical parts.

The monomers having the formula of Structure II are used as the starting materials in preparing the new polymers of this invention. These monomers can be prepared, for example, as described in U.S. Patent 2,584,140, granted February 5, 1952, by the rearrangement of Diels-Alder adducts of hexachlorocyclopentadiene and benzoquinones. The preparation of such adducts has been described, for example, in U.S. Patent 2,584,139, granted February 5, 1952. Suitable benzoquinones to be used for the addition reaction to form starting materials useful in the preparation of the polymers of this invention are therefore 2,3-$R_2R_2$-1,4-benzoquinones in which $R_1$ and $R_2$ are independently selected from the group consisting of hydrogen, halogen, phenyl, and lower aliphatic radicals. By lower aliphatic radicals are meant those which contain up to four carbon atoms. Typical examples of some suitable benzoquinones are therefore benzoquinone itself, toluquinone, phenylbenzoquinone, monobromobenzoquinone, diallylbenzoquinone, 2,3-dichlorobenzoquinone, 2,3-dimethylbenzoquinone, ethylbenzoquinone, isopropylbenzoquinone, butylbenzoquinone, and the like.

This method of preparing the present composition comprises contacting a compound of the general formula of Structure II with phosgene in the presence of an acid acceptor. By acid acceptor, or acid binding agent, is meant a substance which will take up the hydrogen chloride released during the reaction of the Structure II with phosgene. One type of suitable acid acceptor is an aqueous alkali such as aqueous solutions of sodium hydroxide, potassium hydroxide, sodium carbonate, potassium carbonate, and the like. When such an aqueous alkali is used as the acid acceptor, at least two moles of the alkali should be used for each mole of Structure II. However, it is advantageous to use an excess of the aqueous alkali; and it is therefore preferred to use from about three to about eight moles of alkali for each mole of Structure II. It is most preferred to use about six moles of alkali for each mole of Structure II.

Another suitable type of acid acceptor is a tertiary amine such as pyridine, triethylamine, tri-n-propylamine, triisoamylamine, dimethylaniline, N,N-dimethyl-p-toluidine, diethylaniline, and the like. Such tertiary amines are advantageous acid acceptors for the method of this invention since they also serve to catalyze the reaction. Further, many of the amines are also good solvents for the reactants and the products. Pyridine, for example, can function simultaneously as an acid acceptor, a catalyst, and a solvent, and is therefore a preferred tertiary amine for use in the method of this invention. The tertiary amines can be used in the same molar proportions as the aqueous alkalies.

Polymeric compositions of improved molecular weights can be obtained by the use of suitable catalysts in the method of this invention. Although such compositions can be obtained by prolonged reaction time without a catalyst, the use of a catalyst is desirable. As was noted above, the tertiary amines when employed as acid acceptors can also function as catalysts. However, quaternary ammonium bases have been found to be good catalysts. Such quaternary ammonium bases are compounds of the type benzyltrimethylammonium chloride, benzyltrimethylammonium hydroxide, (2-hydroxyethyl)-trimethylammonium bicarbonate, hexadecyltrimethylammonium chloride, octadecyltrimethylammonium chloride, benzyldimethylphenylammonium chloride, 2-dodecylisoquinolinium bromide, 1-hexadecylpyridinium chloride, (2-acetoxypropyl)-trimethylammonium bromide, tetraethylammonium chloride, and the like. These quaternary ammonium bases can be used in catalytic quantities. It is preferred to use less than about ten percent by weight of such bases calculated on the weight of Structure II.

While this method can be carried out in aqueous suspension or in a solvent system which consists entirely of one or more of the tertiary amine acid acceptors, additional inert solvents can also be used if desired. Some typical suitable solvents are dimethylformamide, dioxane, chloroform, tetrahydrofuran, ethylene carbonate, methylene chloride, chlorobenzene, cyclohexanone, and the like.

The temperature at which the method of this invention can be carried out is not critical. The reaction is ordinarily exothermic, and cooling of the reaction mixture is desirable to prevent too rapid reaction and decomposition. Reaction temperatures in the range from about 0° to about 50° C. are preferred, and reaction temperatures in the range from about 15° to about 35° C. are most preferred. While the reaction is ordinarily carried out at atmospheric pressure, superatmospheric pressures can also be used to facilitate the reaction if desired.

The quantity and the rate of addition of the phosgene are not critical. Ordinarily, the phosgene can be introduced into the reaction mixture until the reaction is no longer exothermic and the mixture becomes viscous. The resulting polymer can then be isolated in several ways. It can be precipitated and washed with a nonsolvent such as methanol or acetone. Alternately, the polymer can be taken up in a solvent, and the solution can be washed thoroughly with water and dried before the solvent is removed to leave a residue of the polymer.

The manner in which the composition of this invention can be prepared is illustrated in the following examples. Variations in the conditions of the resin forming method result in resins with a variety of properties. Unless otherwise noted, temperatures are in degrees centigrade.

EXAMPLE 1

*Preparation and rearrangement of the benzoquinone-hexachlorocylopentadiene adduct*

Hexachlorocyclopentadiene (214 g.) was heated slowly with benzoquinone (82.6 g.) to a temperature of about 130–160° and maintained in that temperature range for about fifteen minutes. The hot reaction mixture was then poured into a chilled beaker and quenched with hexane. Repeated recrystallization from a benzene-hexane mixture gave the desired adduct as a yellow crystalline solid, M.P. 184°.

The adduct (2.0 g.) prepared above was dissolved in methanol to which 5 drops of pyridine had been added. The mixture was refluxed for about 0.5 hr. (the solution decolorized in about 10 minutes), and then a few drops of sulfuric acid were added. The solution was evaporated to about one-half volume, whereupon water was added to precipitate a white solid of 5,8-dihydroxy-1,2,3,4,9,9-hexachloro-1,4-dihydro-1,4-methanonaphthalene, M.P. 184–186° after recrystallization from methanol.

EXAMPLE 2

*Formation of a resin in the presence of aqueous alkali and a catalyst*

A 1-liter flask fitted with a stirrer, thermometer, gas inlet tube, and condenser was charged with 5,8-dihydroxy-1,2,3,4,9,9 - hexachloro - 1,4 - dihydro - 1,4 - methanonaphthalene (76.2 g.; 0.2 mole), sodium hydroxide pellets (20.0 g.; 0.5 mole), 3.3 ml. of an aqueous 60% benzyltrimethylammonium chloride solution, 330 ml. of distilled water, and 167 ml. of methylene chloride. The mixture was cooled to 20° C., and phosgene was then introduced at the rate of about 0.6 g. per minute for 75 minutes, during which time an additional 7 g. of NaOH pellets were added. The water layer was poured off from the reaction mixture, and the methylene chloride was evaporated on the steam bath. The contents of the flask were broken up into small pieces and dried overnight at 80°–90° in a vacuum oven. The dried material, which weighed 90.7 g., was pulverized, washed with water, and dried overnight at 90° under vacuum.

EXAMPLE 3

*Properties of the resin*

The dried resinous product prepared in Example 1 was found to be insoluble in methanol and acetone but soluble in tetrachloroethylene. It had a Fisher-Johns melting point of greater than 300°. A hot melt film prepared from this resin at 600° F. and 500–1000 p.s.i was found to have good flow properties.

EXAMPLE 4

*Formation of a resin in the presence of tertiary amine alone*

5,8 - dihydroxy - 1,2,3,4,9,9 - hexachloro - 1,4-dihydro-1,4-methanonaphthalene (41 g.; 0.1075 mole) was dissolved in 225 ml. of reagent grade pyridine in a 300 ml. flask fitted with a stirrer, thermometer, and condenser with a CaCl$_2$ drying tube and constant water flow system. Phosgene was bubbled through the solution at a rate of about 0.25 g. per minute with stirring while the temperature was maintained at 25°–30° by means of an ice-water bath applied as required. When the solution became viscous, the gas flow was reduced to a very slow rate. The gassing was stopped when the mixture developed a yellow color. The reaction mixture was poured into water with vigorous stirring; and the precipitated polymer was filtered, washed with water, and suspended in 1-liter of water at 80° with stirring. The polymer was filtered again and dried overnight in a vacuum oven at 75°. The dried and powdered product was found to have a softening point of 175°–180°.

EXAMPLE 5

*Formation of a resin in the presence of tertiary amine and a catalyst*

A 500-ml. round-bottomed flask fitted with a mechanical stirrer, reflux condenser, internal thermometer, and gas inlet tube was charged with 5,8-dihydroxy-1,2,3,4,9,9-hexachloro - 1,4 - dihydro - 1,4 - methanonaphthalene (50 g.; 0.131 mole), 42 ml. of pyridine, 200 ml. of methylene chloride, and 2.5 ml. of a 40% solution of benzyltrimethylammonium hydroxide in methanol. The solution was cooled to 20°, and phosgene was bubbled into the reaction mixture for 75 minutes, the temperature being maintained at 30° within 3° by use of an ice bath. The reaction mixture was filtered with suction, and the solid was washed with a little methylene chloride. The organic layer was washed twice with a mixture of 200 ml. water and 25 ml. concentrated HCl and dried over anhydrous sodium sulfate. The residue remaining after evaporation of the solvent on the steam bath was dried at 80° for several hours, pulverized, and dried overnight at 80° in a vacuum oven. The dried tan solid had a melting range of 200°–230°.

A wide variety of other compounds having the general formula of Structure II can be contacted with phosgene in the presence of an acid acceptor to produce the new thermoplastic resins of this invention. The following examples illustrate the preparation of suitable starting materials of the Structure II formula by the general method detailed in Example 1.

EXAMPLE 6

The rearrangement of the adduct of hexachlorocyclopentadiene and toluquinone yields 5,8 - dihydroxy-6-methyl - 1,2,3,4,9,9 - hexachloro - 1,4 - dihydro - 1,4-methanonaphthalene.

EXAMPLE 7

The rearrangement of the adduct of hexachlorocyclopentadiene and phenylbenzoquinone yields 5,8-dihydroxy-6 - phenyl - 1,2,3,4,9,9 - hexachloro - 1,4 - dihydro-1,4-methanonaphthalene.

EXAMPLE 8

The rearrangement of the adduct of hexachlorocyclopentadiene and monobromobenzoquinone yields 5,8-dihydroxy - 6 - bromo - 1,2,3,4,9,9 - hexachloro-1,4-dihydro-1,4-methanonaphthalene.

EXAMPLE 9

The rearrangement of the adduct of hexachlorocyclopentadiene and diallylbenzoquinone yields 5,8-dihydroxy-6,7 - diallyl - 1,2,3,4,9,9 - hexachloro - 1,4 - dihydro-1,4-methanonaphthalene.

EXAMPLE 10

The rearrangement of the adduct of hexachlorocyclopentadiene and 2,3-dichlorobenzoquinone yields 5,8-dihydroxy - 1,2,3,4,6,7,9,9 - octachloro - 1,4 - dihydro-1,4-methanonaphthalene.

EXAMPLE 11

The rearrangement of the adduct of hexachlorocyclopentadiene and 2,3-dimethylbenzoquinone yields 5,8-dihydroxy - 6,7 - dimethyl - 1,2,3,4,9,9 - hexachloro - 1,4-dihydro-1,4-methanonaphthalene.

EXAMPLE 12

The rearrangement of the adduct of hexachlorocyclopentadiene and ethylbenzoquinone yields 5,8-dihydroxy-6 - ethyl - 1,2,3,4,9,9 - hexachloro - 1,4 - dihydro - 1,4-methanonaphthalene.

EXAMPLE 13

The rearrangement of the adduct of hexachlorocyclopentadiene and isopropylbenzoquinone yields 5,8-dihydroxy-6-isopropyl-1,2,3,4,9,9 - hexachloro - 1,4 - dihydro-1,4-methanonaphthalene.

EXAMPLE 14

The rearrangement of the adduct of hexachlorocyclopentadiene and butylbenzoquinone yields 5,8-dihydroxy-6-butyl-1,2,3,4,9,9-hexachloro-1,4-dihydro - 1,4 - methanonaphthalene.

Further examples of the resin forming method of this invention are summarized in the following table. The reaction of the particular Structure II with phosgene is carried out under the conditions given. The quantity of acid acceptor is expressed in moles per mole of Structure II, while the quantity of catalyst is expressed as the percent by weight of Structure II.

| Ex. No. | Structure II of Example | Acid Acceptor (Moles) | Catalyst (Wt. percent) | Solvent | Temp. |
|---|---|---|---|---|---|
| 15 | 1 | Aqueous KOH (2). | Hexadecyltrimethylammonium chloride (2). | Tetrachloroethylene. | 50 |
| 16 | 1 | Aqueous NaOH (8). | 1-Hexadecylpyridinium chloride (10). | Methylenechloride. | 0 |
| 17 | 11 | Aqueous NaOH (6). | Tetraethylammonium chloride (5). | Tetrachloroethylene. | 30 |
| 18 | 10 | Pyridine (8) | Benzyltrimethylammonium chloride (5). | Pyridine | 20 |
| 19 | 12 | Aqueous sodium carbonate (8). | Benzyltrimethylammonium chloride (10). | Methylene chloride. | 25 |
| 20 | 1 | Pyridine (6) | Pyridine | Pyridine | 15 |
| 21 | 1 | Triethylamine (3). | Triethylamine | Methylene chloride. | 35 |

The properties of the self-extinguishing thermoplastic resins produced by the method of this invention make them useful in many applications. They can be molded for example, to give many useful items such as cover plates, dials, light cell reflector bases, and other parts in the electrical and electronics industry.

I claim:
1.

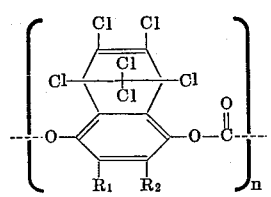

wherein $n$ is an integer from 15 to 1,000; and $R_1$ and $R_2$ are independently selected from the group consisting of hydrogen, halogen, phenyl and lower aliphatic radicals.

2. Composition of claim 1 wherein $n$ is an integer from 50 to 250.

3. Composition of claim 1 wherein $R_1$ and $R_2$ are hydrogen.

4. Composition of claim 1 wherein $R_1$ is halogen and $R_2$ is hydrogen.

5. Composition of claim 1 wherein $R_1$ is phenyl and $R_2$ is a lower aliphatic radical.

6. Composition of claim 1 wherein $R_1$ and $R_2$ are lower aliphatic radicals.

7. Composition of claim 1 wherein $R_1$ and $R_2$ are halogen.

8. Composition of claim 1 wherein $R_1$ is methyl and $R_2$ is hydrogen.

9. Composition of claim 1 wherein $R_1$ is phenyl and $R_2$ is hydrogen.

10. Composition of claim 1 wherein $R_1$ is chlorine and $R_2$ is hydrogen.

References Cited by the Examiner

UNITED STATES PATENTS

| 2,584,140 | 2/1952 | Segel et al. | 260—621 |
| 2,991,273 | 7/1961 | Hechelhammer et al. | 260—47 |
| 2,997,459 | 8/1961 | Schnell et al. | 260—47 |

FOREIGN PATENTS 809,735   3/1959   Great Britain.

SAMUEL H. BLECH, *Primary Examiner.*